United States Patent [19]
Mueller

[11] 3,768,497
[45] Oct. 30, 1973

[54] EMERGENCY GAS SHUT-OFF VALVE

[76] Inventor: William Lynn Mueller, 429 Dellbrook Ave., San Francisco, Calif.

[22] Filed: Aug. 23, 1971

[21] Appl. No.: 174,076

[52] U.S. Cl. .................................. 137/38, 251/213
[51] Int. Cl. ............................................. F16k 17/36
[58] Field of Search ....................... 137/38, 43, 456; 251/213

[56] References Cited
UNITED STATES PATENTS

| | | | |
|---|---|---|---|
| 2,585,316 | 2/1952 | Hobson | 137/38 |
| 2,927,592 | 3/1960 | Ferre | 137/38 |
| 762,890 | 6/1904 | Eaton | 137/459 |
| 1,683,338 | 9/1928 | Evinrude | 137/43 |
| 2,201,782 | 5/1940 | McCollum | 251/213 X |
| 2,281,135 | 3/1942 | Becker | 137/38 X |

FOREIGN PATENTS OR APPLICATIONS

| 26,797 | 10/1920 | Denmark | 137/38 |
|---|---|---|---|

Primary Examiner—Robert G. Nilson
Attorney—Manfred M. Warren et al.

[57] ABSTRACT

An emergency gas shut-off valve for interrupting the flow of gas from a main gas line to a feeder line upon imposition of a severe shock, such as a seismic disturbance. The device includes a housing with which the gas lines are in fluid communication. A relatively heavy ball is maintained in position on a platform within the housing, and its tendency to be dislodged may be adjusted by changing the horizontal position of the platform so that the ball is caused to be displaced from its rest position to shut-off position if the entire device is jarred horizontally. The ball, when in shut-off position, overlays, or causes another member to overlay, one of the gas lines, so that gas flow is interrupted.

5 Claims, 7 Drawing Figures

PATENTED OCT 30 1973
3,768,497
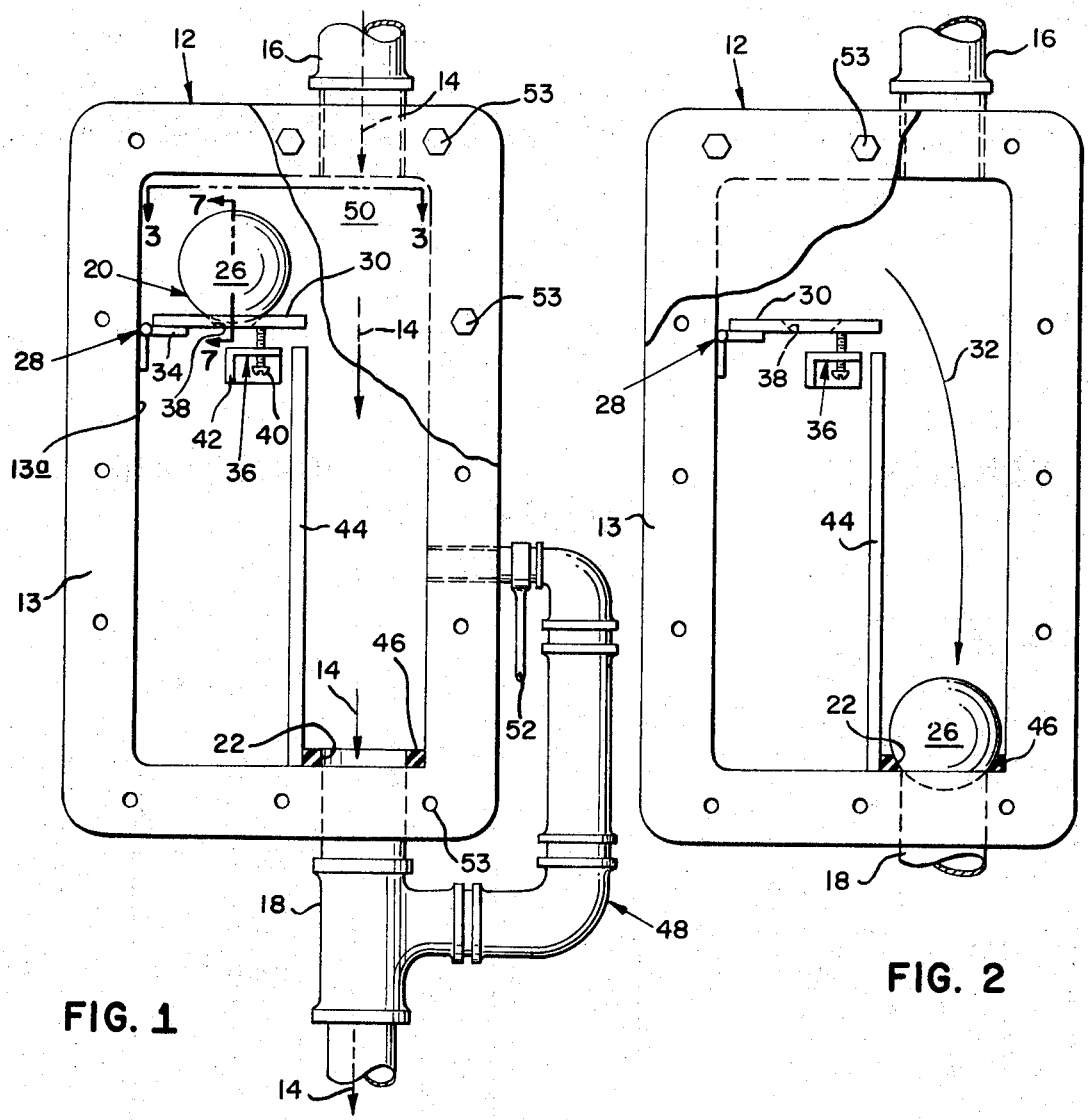
FIG. 1
FIG. 2
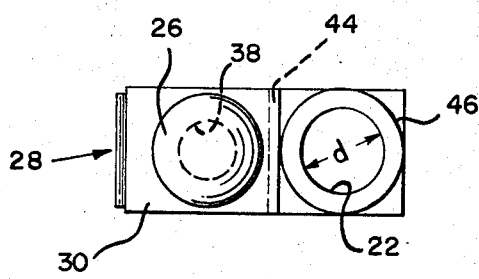
FIG. 3
INVENTOR.
WILLIAM LYNN MUELLER
BY
*Warren, Rubin, Brucker & Chickering*
ATTORNEYS

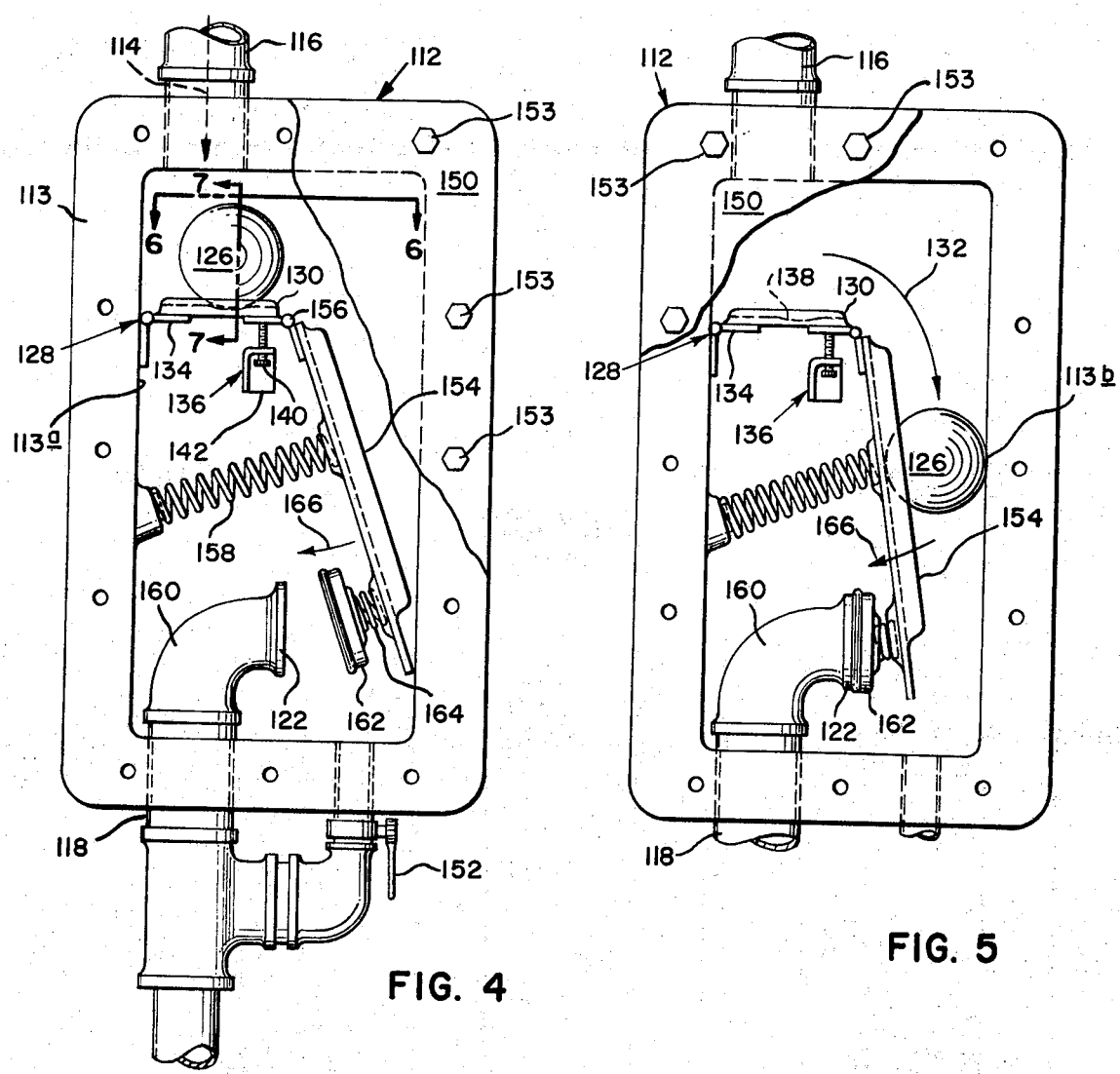
FIG. 4
FIG. 5
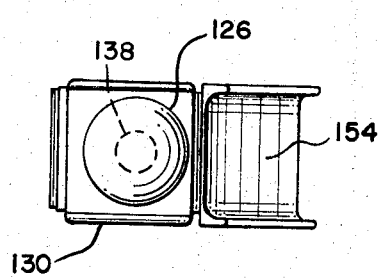
FIG. 6
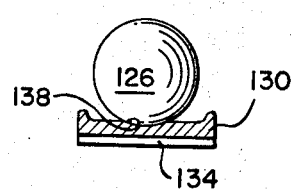
FIG. 7
INVENTOR.
WILLIAM LYNN MUELLER

EMERGENCY GAS SHUT-OFF VALVE

This invention relates to a gas shut-off valve and more particularly to one sensitive to physical shock such as encountered during earthquakes or other kinds of physical trauma which produce shock. Moreover, while the following specification may refer to natural gas lines and the protection of conventional structures such as residences and common commercial and industrial buildings, my invention may be used to protect a variety of types of areas occupied by lines carrying various hazardous gases, be they corrosive, explosive, or toxic.

For the purpose of explanation, and by way of example only, attention is directed to a common hazard encountered during and after relatively severe earthquakes wherein natural gas fuel lines leading into an ordinary residence or commerical structure may be damaged and thus cause leakage of gas from the lines into the surrounding air space. This may occur in cases of such shock in and around the gas pipe unions to hot water heaters, due to the inertia of the latter so as to resist movement while the adjacent piping may experience substantial displacement. Such displacement can cause rupture, especially at a union where the pipe is threaded and coupled to another. Thereafter, the gas will almost inevitably leak into the surrounding space until an explosive solution with the atmosphere is formed that may be detonated by a pilot light which could still be on, since sufficient gas to keep a pilot going may persist in its lines, even after the aforementioned rupture. Or, if the pilots are out, detonation may be caused by a spark or inadvertent striking of a match. In any event the fire hazard after earthquake due to broken gas lines within a home or commerical structure is well known and is a substantial threat to life, limb, and property.

The foregoing described problem, and others like it involving the need to cut-off the flow of gas through a line after severe vibrational shock, requires a gas shut-off valve sensitive to physical shock, or a drip in pressure in the gas line; and that will remain reliable after long periods of inactivity.

While I am familiar with cut-off valves such as exemplified by the U.S. Pat. No. 762,890 to Eaton and Fay, patented June 21, 1904; and U.S. Pat. No. 1,031,224 to Zaphiriadis, patented July 2, 1912, each of these are pressure sensitive devices and have disadvantages which my invention overcomes. For example, the device disclosed by Eaton and Fay will act to cut-off flow of gas through the main and feeder lines even under normal operation, when no gas is being used from the line. Thereafter, to renew the flow of gas, the cut-off valve must be manually actuated. This is impracticable for a main safety shut-off valve to an entire home or commerical building where gas flow may vary from off to on any number of times a day.

The Zaphiriadis device is also pressure sensitive cut-off device which relies on a rubberized deflatable balloon inflated by main line gas pressure, and a spring actuated cut-off valve which is set in motion to the off position by deflation of the balloon should main line pressure drop due to line rupture. Such a device is uncommonly prone to system failure after passage of time, i.e. rubberized balloons, spring actuated valves; and, like Eaton and Fay, relies upon the indirect action of a shock, i.e. line failure and subsequent pressure drop, rather than directly upon the vibratory action of the shock hazard itself. Another type of fluid cut-off device with which I am familiar, designed, however, for a different type of hazard (overheating) but which employs structure which would also react to physical shock, is that exemplified by the U.S. Pat. No. 1,580,277 to Bard, patented Apr. 13, 1926. Bard utilizes a steel ball which may be dislodged under conditions of sufficient shock and thence merely dropped directly into the orifice through which the gas passes, thus cutting off gas passage therethrough. The difficulty with this type of device, however, is that it is not adjustable to accommodate varying degrees of shock to which the instrument may be made sensitive, a most important feature and advantage of the invention herein.

Thus it is an object of the present invention to provide an emergency gas safety cut-off device which is directly sensitive to shock impact of a predetermined magnitude, so that upon imposition of such a shock upon the device the flow of gas therethrough from a main line to a feeder line will be promptly, reliably, and positively interrupted.

It is a further object of the present invention to provide a gas shut-off device whose sensitivity to the degree and amplitude of shock to which it will respond may be varied, i.e. increased or decreased, and by a relatively simple adjustment device.

It is also an important object of the present invention to provide a safety shut-off device having a high degree of reliability, fabricated from a minimum of relatively simple and inexpensive components, so that the entire device may be economically marketed and easily and inexpensively maintained.

A further advantage of the present invention is that operation is relatively independent of pipe condition, such as scaliness, moisture, and the like.

Turning now to the drawings, an initial embodiment If my invention is shown at FIG'S. 1-3, inclusive, while an alternative embodiment appears at FIG'S 4-6, inclusive; FIG. 7 is common to both embodiments. More specifically, FIG. 1 is a front elevation of the device embracing my invention with a portion of the front plate cover thereof shown fragmented to reveal more clearly certain details of construction within the housing and with a portion of the device therewithin shown in the so-called rest position;

FIG. 2 is in all major respects the same as FIG.1 except that one portion therewithin shown at the rest position in FIG. 1 is shown in the so-called shut-off position in FIG.2;

FIG. 3 is a view taken along line 3—3 of FIG. 1;

FIG. 4 is a front elevation of an alternative embodiment of a device embracing my invention with a portion of the front cover plate thereon shown fragmented to reveal more clearly certain details of construction within the housing and with a portion of the device therewithin shown in the so-called rest position;

FIG. 5 is in all major respects the same as FIG. 4 except that the portion therewithin shown at the rest position in FIG. 4 is shown in the so-called shut-off position in FIG. 5;

FIG. 6 is a view taken along line 6—6 of FIG. 1; and

FIG. 7 is a view taken along line 7—7 as depicted in either FIG. 1 and/or FIG. 4.

My invention may be understood by referring first to FIG. 1 wherein I show emergency gas device 12. This device interrupts flow of gas or other fluid which normally travels through housing 13 in the direction of arrows 14 from main gas line 16 and through feeder line 18, unless and until the device is subjected to a shock of predetermined magnitude, such as seismic disturbance, that could result in the various damaging consequences described hereinabove in the introductory paragraphs of the specification.

Such beneficial interruption of gas (or other types of fluid) flow following the occurrence of a general shock is achieved through the agency of shut-off means 20 acting upon orifice 22 defined by the terminal portion of feeder line 18.

More particularly shut-off means 20, according to the embodiment of FIG.'S 1-3 and 7, includes ball 26 fabricated of a relatively dense and resilient material, preferably a metal such as steel or iron, or a nonferrous metal, or even a dense plastic, having a diameter at least slightly larger than dismeter $d$(FIG. 3) of orifice 22. Ball 26, during normal gas flow conditions (FIG.1), resides on platform means 28 in so-called rest position. In such condition gas or other fluid may flow uninterruptedly in the direction of arrows 14 as noted above. However, upon imposition of a shock of predetermined magnitude, explained in greater detail hereinafter, to the environment, including main gas line 16 and feeder line 18, ball 26 is displaced from its platform and falls along the trajectory of arrow 32 (FIG. 2) to the shut-off position as shown in FIG. 2, i.e. so as to block orifice 22 and prevent further gas or fluid flow therethrough. Thus, should feeder line 18, or any portion of a network of lines interconnected to the feeder line, become ruptured due to the aforementioned shock or seismic disturbance, gas flow therethrough to the surrounding atmosphere is arrested, and subsequent potential hazard by explosion or other mishap which could be caused by the escape of the particular fluid is prevented.

A further desirable feature according to the present invention is that its sensitivity, i.e. its response to shock which wil cause ball 26 to be repositioned from its rest position (FIG. 1) to shut-off position (FIG. 2), may be easily adjusted over a board range of values, so that the device may be used for a variety of applications. That is shut-off may be set to occur when housing 13 is displaced as little as one-sixteenth inch in the horizontal direction; or may be limited to occur only under the influence of a fairly severe seismic displacement, i.e. horizontal displacement of up to one-half inch or more.

More specifically the foregoing adjustment feature is accomplished by platform 30 pivotally connected at one end thereof to housing wall 13a by means of hinge 34 and at the other end by means of set screw assembly 36. Platform 30 is fabricated to include ball seat 38 which normally locates and holds ball 26 in position thereon. Set screw 40 is threadedly carried by bracket 42 and emerges upwardly therethrough to supportably contact the end of platform 30 opposite its hinged end. By adjusting set screw 40 upwardly, or downwardly, the degree of horizontal displacement required to cause ball 26 to be displaced from platform 30 may be varied. That is if set screw 40 is advanced upwardly as shown in FIG. 2, the amount of horizontal shock required to actuate my device to the shut off position is increased; and, if withdrawn downwardly, the amount of shock which will cause shut-off is decreased. In this manner I may adjust my device to respond to a broad range of shock values for application under various hazard requirements and conditions.

Certain further refinements and details of my invention may be noted. For example, I prefer to provide my device with an internal guide baffle 44 which assures guidance of ball 26 to its shut-off position once displaced from platform 30. In addition I have found it desirable to provide orifice 22 with annular seat 46 which may be formed of a relatively soft material so as to insure good scaling of ball 26 therewith when the ball comes to rest in the shutoff position.

It should also be observed that I prefer to arrange my device so that shut-off occurs at the inlet to the feeder line, thus minimizing the possibility of gas leakage in the shut-off position. My device will function if the orientation of main gas and feeder lines are interchanged, but in such case, should the inlet gas pressure be great enough, the possibility of leakage in and around ball 26 when seated in its shut-off position would be increased.

I have also found it convenient to provide the shut-off device embodying my invention with by-pass valve assembly. Normally this by-pass assembly is maintained with by-pass valve 52 in the closed position so that no gas flow may pass therethrough. Once ball 26 is displaced to the shut-off position, but it is deemed safe and desirable to reestablish gas flow through my device prior to resetting, such resumption of service may be achieved merely by turning the handle of valve 52 to its open position.

Resetting of my device after shut-off is also relatively easily accomplished, another feature of the present invention. This is accomplished by merely removing housing cover 50 which is gas-tightly bolted to housing 13 by means of bolts or cap screws 53; and then manually repositioning ball 26 to its rest position atop platform 30. Thereafter, cover 50 is replaced, bolted into position, and operation resumed. This may be done with such ease and rapidity that in many instances gas fluid flow through the system as a whole need not even be turned off, although such precaution under most circumstances is recommended.

An alternative embodiment of my invention is shown in FIG.'S 4 through 7. Numberal designations in the one hundred series are employed in FIG.'S 4-7, and such designations generally correspond to those in FIG.'S 1-3, i.e. the shut-off device 12 of FIG.'S 1-3 corresponds to the shut-off device 112 of FIG.'S 4-7. It is understood that such corresponding elements, although designated in the alternative drawing, are not repeated in the explanation thereof, except as may be necessary in its explanation.

The basic difference between the alternative embodiment of FIG.'S 4-7 and the embodiment of FIG.'S 1-3 is in the structure of the shut-off means itself.

More specifically in the alternative embodiment ball 126 normally resides atop platform 130 which, like its corresponding member 30 of FIG.'S 1-3, is hinged at one end and adjustably supported at the other. Additionally, plate 154 is pivotally connected to the adjustably supported end of the platform by means of hinge 156. By means of this plate I am able to achieve a somewhat more positive closure of feeder line 118 than is generally feasible using the assembly of my early described embodiment as will now be apparent to one of ordinary skill in the art.

Plate 154 generally depends from hinge 156 but is urged ottwardly from the straight vertical by compression spring 158. Feeder line 118 communicates with the interior of housing 113 via inlet elbow 160 which terminates in vertically aligned orifice 122. Closure diaphram 162 is compressibly mounted by means of spring connector 164 to the lower end of plate 154 and located thereon so as to be poised just opposite from orifice 122, when the device is normally operating, i.e. gas flows from main line 116 in the direction of arrows 114 through feeder line 118.

Upon imposition of a shock to the system of predetermined magnitude great enough to dislodge ball 126 from its normal rest position atop platform 130, the ball falls in the direction of arrow 132 (FIG. 5) and wedges itself between plate 154 and adjacent wall portion 113b. In so doing ball 126 forces plate 154 in the direction of arrow 166 bringing closure diaphram 162 into shut-off position over the orifice of feeder line 118, thus interrupting gas or other fluid flow in the event of a shock or predetermined magnitude. Thereafter the instrument is easily reset by removing ball 126 from its wedged position and replacing it atop platform 130.

Under certain conditions it is safe to employ my device with the gas flow therethrough opposite to that shown by arrows 114, i.e. so that the main line is conduit 118 and pipe 116 becomes the feeder line. When this arrangement is employed it may be possible to eliminate compression spring 158 employed to normally position plate 154 out of contact with the open end or orifice 122. That is, under proper conditions of gas flow rate and pressure, the gas entering housing 113 through orifice 122 may exert sufficient fluid current pressure against the lower end of plate 154, that such flow itself will maintain passage therethrough without the use of compression spring 158.

One of the advantages of this alternate embodiment over the first explained hereinabove resides in the use of a movable wedge (ball 126) to engage and urge plate 154 into overlaying and blocking contact of orifice 122. In this way greater mechanical closing pressure is developed at the interface of closure diaphram 162 and the orifice than can be accomplished by means of direct contact of the ball alone.

Still another feature of my alternative embodiment resides in the cooperation between the increased diaphram pressure mentioned above and the vertical alignment of orifice 122. It is known that scale deposits and other wastes accumulate in gas pipes and the like. Such deposits may foul valve seats, and especially orifices closed off simply by a ball dropping in place as is the case in the first embodiment of my invention explained above. In my alternative embodiment, however, this is overcome both by the vertical alignment of orifice 122, so that scaley deposits and other accumulations cannot accumulate on the orifice seat; and by the increased pressure with which closure diaphram 162 is imposed upon orifice 122.

In the structure shown of my alternative embodiment it is also worth noting that both platform 130 and plate 154 are shaped to form channel-like sections (FIG.'S 6 and 7) to assure proper control of ball 126 when actuated from the rest to shut-off positions.

It should also be noted that the structure of platform 30 and/or 130, may take the form as shown in FIG.'S 1-3 or 4-7. That is at FIG.'S 1-3 I show a platform with an orifice-like seat to assist in retaining ball 26; this structure too could be used in the alternative embodiment of FIG.'S 4-7. Similarly, the channel-like construction of platform 130 shown in FIG.'S 4-7 could be substituted in the embodiment of FIG.'S 1-3 and is so indicated by the section line shown as FIG. 1.

I claim:

1. An emergency gas shut-off device for interrupting the flow of gas from a main gas line to a feeder line in the event said device is subjected to a shock of predetermined magnitude, such as a seismic disturbance, comprising:

a housing to receive said main and feeder lines in fluid communication with the interior thereof;

an orifice defined by the terminal portion of at least one of said lines proximate said housing;

plate means movably connected within said housing and positionable to a rest position and a shut-off position, said means shaped to block said orifice and prevent fluid flow therethrough when in the shut-off position and not affect such flow when in the rest position;

positioning means associated with said plate means to normally urge the latter to said rest position;

platform means located within said housing; and movable wedge means located within said housing for normal operating position at rest upon said platform means out of contact with said plate means, and removable therefrom to engage and urge said plate means and move the latter into overlaying and blocking contact of said orifice when said housing is subjected to a shock such as a seismic disturbance, of predetermined magnitude.

2. The device in accordance with claim 1 and wherein the line whose terminal position defines said orifice is said feeder line.

3. The device in accordance with claim 1 and wherein further said movable wedge means comprises:

a ball fabricated of a relatively dense and resilient material; and said platform means shaped to form a seat for said ball and prevent movement of the latter unless and until said housing is subjected to said shock of predetermined magnitude, whereupon the ball is displaced out of and away from said platform seat oriented within said housing so that such displacement of the ball causes the ball to engage and move said plate means into said over-laying and blocking contact of said open end of one of said lines.

4. The device in accordance with claim 1 and wherein further the line whose orifice is subject to closure by said plate means is the main gas line; and said positioning means associated with said plate means to normally position the plate means out of contact with said orifice comprises the gas flowing into said chamber through said main gas line pressurably impinging upon the end of said plate means proximate thereto so as to deflect said plate means out of contact with said orifice.

5. The device in accordance with claim 1 and wherein further said platform means comprises a shelf disposed in a generally horizontal position, one end of said shelf being pivotally mounted within said housing and the other end supported by adjustable screw means mounted proximate thereto, said screw means adjustable to raise and lower the end of the shelf proximate thereto so that the tendency of said movable wedge means to remain at rest upon said platform seat is increased or decreased depending upon the setting of said screw means whereby the predetermined magnitude of shock necessary to dislodge the movable wedge means from said shelf may be increased or decreased.

* * * * *

UNITED STATES PATENT OFFICE
CERTIFICATE OF CORRECTION

Patent No. 3,768,497          Dated Oct. 30, 1973

Inventor(s) WILLIAM LYNN MUELLER

It is certified that error appears in the above-identified patent and that said Letters Patent are hereby corrected as shown below:

Column 3, line 3, after "line 16" insert --to--.

Column 3, line 19, "dismeter" is corrected to --diameter--.

Column 3, line 43, "board" is corrected to --broad--.

Column 4, line 10, "scaling" is corrected to --sealing--.

Column 4, line 68, "ottwardly" is corrected to --outwardly--.

Signed and sealed this 9th day of July 1974.

(SEAL)
Attest:

McCOY M. GIBSON, JR.       C. MARSHALL DANN
Attesting Officer          Commissioner of Patents